US012786834B2

(12) United States Patent
Sharma

(10) Patent No.: US 12,786,834 B2
(45) Date of Patent: Nov. 3, 2026

(54) METHOD AND APPARATUS FOR ENHANCING QUALITY OF VOICE OVER Wi-Fi CALL IN A WIRELESS COMMUNICATION SYSTEM

(71) Applicant: Samsung Electronics Co., Ltd., Suwon-si (KR)

(72) Inventor: Himanshu Sharma, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 237 days.

(21) Appl. No.: 18/433,773

(22) Filed: Feb. 6, 2024

(65) Prior Publication Data

US 2025/0039758 A1 Jan. 30, 2025

Related U.S. Application Data

(63) Continuation of application No. PCT/KR2023/017967, filed on Nov. 9, 2023.

(30) Foreign Application Priority Data

Jul. 28, 2023 (IN) ............................ 202311051050

(51) Int. Cl.
*H04W 36/30* (2009.01)
*H04W 36/00* (2009.01)
(Continued)

(52) U.S. Cl.
CPC ... *H04W 36/304* (2023.05); *H04W 36/00837* (2018.08); *H04W 36/142* (2023.05); *H04W 76/15* (2018.02); *H04W 84/12* (2013.01)

(58) Field of Classification Search
CPC ......... H04W 36/304; H04W 36/00837; H04W 36/142; H04W 36/1446; H04W 76/12; H04W 76/15; H04W 84/12; H04W 88/06
See application file for complete search history.

(56) References Cited

U.S. PATENT DOCUMENTS 11,197,204 B2 12/2021 Faus Gregori
11,310,702 B2 * 4/2022 Mohamed ........... H04W 36/385
(Continued)

FOREIGN PATENT DOCUMENTS

CN 106658622 A * 5/2017 ............ H04W 36/22
CN 110248397 A 9/2019
(Continued)

OTHER PUBLICATIONS

Search Report and Written Opinion dated Apr. 18, 2024 issued in International Patent Application No. PCT/KR2023/017967.
(Continued)

*Primary Examiner* — Sujoy K Kundu
*Assistant Examiner* — Vladislav Y Agureyev
(74) *Attorney, Agent, or Firm* — NIXON & VANDERHYE P.C.

(57) ABSTRACT

The disclosure relates to a 5G or 6G communication system for supporting a higher data transmission rate. Disclosed herein is a method and apparatus for enhancing a quality of a Voice over Wi-Fi (VoWi-Fi) call in an electronic device (300). The method includes detecting, using an evolved Packet Data Gateway (ePDG) interface, a voice communication over a first wireless local area network (WLAN) among a plurality of WLANs associated with a node of a network. The method further includes determining one or more ePDG interface tunnel parameters associated with a plurality of ePDG interface tunnels. The method further includes establishing, upon detecting a change in the one or more determined ePDG interface tunnel parameters, the voice communication using a second WLAN among the plurality of WLANs to enhance the quality of the VoWi-Fi call.

16 Claims, 13 Drawing Sheets

(51) Int. Cl.

| | |
|---|---|
| ***H04W 36/14*** | (2009.01) |
| ***H04W 76/15*** | (2018.01) |
| *H04W 84/12* | (2009.01) |

(56) References Cited

U.S. PATENT DOCUMENTS

| | | | | |
|---|---|---|---|---|
| 11,589,279 | B2 | 2/2023 | Shieh et al. | |
| 2015/0350983 | A1* | 12/2015 | Kwok | H04W 36/247 370/331 |
| 2016/0234749 | A1* | 8/2016 | Singh | H04W 36/302 |
| 2017/0005914 | A1 | 1/2017 | Edge et al. | |
| 2017/0048739 | A1* | 2/2017 | Jeong | H04W 88/06 |
| 2017/0105155 | A1 | 4/2017 | Zhao et al. | |
| 2017/0311362 | A1* | 10/2017 | Hong | H04W 36/0085 |
| 2017/0318511 | A1* | 11/2017 | Niranjan | H04B 17/327 |
| 2017/0339619 | A1* | 11/2017 | Meylan | H04W 16/14 |
| 2018/0206153 | A1* | 7/2018 | Qu | H04M 15/8038 |
| 2018/0220329 | A1* | 8/2018 | Arumugam | H04L 63/0853 |
| 2018/0262465 | A1* | 9/2018 | Määttanen | H04W 12/03 |
| 2018/0343637 | A1* | 11/2018 | Landais | H04W 64/003 |
| 2018/0359663 | A1* | 12/2018 | Kim | H04L 65/1069 |
| 2019/0037465 | A1 | 1/2019 | Srivastava | |
| 2019/0116540 | A1* | 4/2019 | Faus Gregori | H04W 36/0038 |
| 2019/0124559 | A1* | 4/2019 | Brown | H04W 48/06 |
| 2019/0199841 | A1 | 6/2019 | Kim et al. | |
| 2019/0230132 | A1* | 7/2019 | Brown | H03F 1/565 |
| 2020/0100175 | A1* | 3/2020 | Cuevas Ramirez | H04W 88/06 |
| 2020/0107254 | A1* | 4/2020 | Cuevas Ramirez | H04W 88/06 |
| 2020/0107255 | A1* | 4/2020 | Cuevas Ramirez | H04W 88/06 |
| 2020/0221352 | A1 | 7/2020 | Faus Gregori et al. | |
| 2020/0322852 | A1* | 10/2020 | Mohamed | H04W 36/385 |
| 2021/0021646 | A1* | 1/2021 | Chiang | H04L 65/80 |
| 2022/0053315 | A1* | 2/2022 | Wang | H04L 61/2553 |
| 2022/0116265 | A1* | 4/2022 | Boyle, III | H04L 43/20 |
| 2022/0272620 | A1* | 8/2022 | Ninglekhu | H04W 40/02 |
| 2022/0283313 | A1* | 9/2022 | Lekutai | G08G 5/26 |
| 2022/0286994 | A1* | 9/2022 | Singh | H04W 24/04 |
| 2023/0276310 | A1* | 8/2023 | Zhao | H04W 36/249 370/331 |
| 2024/0107359 | A1* | 3/2024 | Jia | H04W 28/0242 |

FOREIGN PATENT DOCUMENTS

| | | | | | |
|---|---|---|---|---|---|
| CN | 112822733 | A | * | 5/2021 | H04W 36/0085 |
| CN | 113271639 | A | * | 8/2021 | H04L 65/65 |
| CN | 111866976 | B | | 4/2023 | |
| CN | 116113003 | | | 5/2023 | |
| CN | 116669042 | A | * | 8/2023 | H04W 12/69 |
| DE | 112017004004 | T5 | * | 4/2019 | H04W 36/00692 |
| EP | 3169120 | A1 | * | 5/2017 | H04W 64/003 |
| EP | 3768021 | A1 | * | 1/2021 | H04L 65/1104 |
| GB | 2548894 | A | * | 10/2017 | H04W 36/0038 |
| GB | 2560994 | A | * | 10/2018 | H04W 48/18 |
| GB | 2561000 | A | * | 10/2018 | H04W 48/18 |
| GB | 2561169 | A | * | 10/2018 | H04W 76/10 |
| WO | WO-2017116853 | A1 | * | 7/2017 | H04W 24/04 |
| WO | WO-2017167701 | A1 | * | 10/2017 | H04L 63/164 |
| WO | WO-2018178241 | A1 | * | 10/2018 | H04W 48/16 |
| WO | WO-2018178293 | A1 | * | 10/2018 | H04W 88/06 |
| WO | WO-2018178294 | A1 | * | 10/2018 | H04W 84/12 |
| WO | WO-2022187850 | A1 | * | 9/2022 | H04W 28/0846 |
| WO | WO-2024189630 | A1 | * | 9/2024 | H04W 36/1446 |

OTHER PUBLICATIONS

Srivastava et al., CLEH—Cross Layer Enhanced Handover for IMS Sessions, 15th IEEE Annual Consumer Communications & Networking Conference (CCNC), 4 pages, 2018.

Extended European Search Report for EP Application No. 23947722.7 dated Jun. 3, 2026, 9 pages.

* cited by examiner

METHOD AND APPARATUS FOR ENHANCING QUALITY OF VOICE OVER Wi-Fi CALL IN A WIRELESS COMMUNICATION SYSTEM

CROSS-REFERENCE TO RELATED APPLICATIONS

This application is a continuation of International Application No. PCT/KR2023/017967 designating the United States, filed on Nov. 9, 2023, in the Korean Intellectual Property Receiving Office and claiming priority to Indian patent application No. 202311051050, filed on Jul. 28, 2023, in the Indian Patent Office, the disclosures of each of which are incorporated by reference herein in their entireties.

BACKGROUND

Field

The disclosure relates to the field of telecommunications, and for example, relates to a method for enhancing a quality of a Voice over Wi-Fi (VoWi-Fi) call in an electronic device.

Description of Related Art 5G mobile communication technologies define broad frequency bands such that high transmission rates and new services are possible, and can be implemented not only in "Sub 6 GHZ" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (cMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

According to an example embodiment of the present disclosure, a method for enhancing a quality of a Voice over Wi-Fi (VoWi-Fi) call in an electronic device is disclosed. The method includes detecting, using an evolved Packet Data Gateway (cPDG) interface, a voice communication over a first wireless local area network (WLAN) among a plurality of WLANs associated with a node of a network.

The method further includes determining one or more ePDG interface tunnel parameters associated with a plurality of ePDG interface tunnels. The method further includes establishing, upon detecting a change in the one or more determined ePDG interface tunnel parameters, the voice communication using a second WLAN among the plurality of WLANs to enhance the quality of the VoWi-Fi call.

According to an example embodiment of the present disclosure, an electronic device for enhancing the quality of the VoWi-Fi call is disclosed. The electronic device includes: at least one processor, a communicator comprising communication circuitry, and a memory. The at least one processor includes a VoWi-Fi service module. The VoWi-Fi service module is configured to detect, using an evolved Packet Data Gateway (cPDG) interface, a voice communication over a first wireless local area network (WLAN) among a plurality of WLANs associated with a node of the network. The VoWi-Fi service module is further configured to determine one or more ePDG interface tunnel parameters associated with a plurality of ePDG interface tunnels. The VoWi-Fi service module is further configured to establish, upon detecting a change in the one or more determined ePDG interface tunnel parameters, the voice communication using the second WLAN among the plurality of WLANs to enhance the quality of the VoWi-Fi call.

To further clarify the disclosure, a more particular description of various example embodiments will be rendered by reference to example embodiments thereof, which are illustrated in the appended drawings. It will be appreciated that these drawings depict example embodiments of the disclosure and are therefore not to be considered limiting of its scope. The disclosure will be described and explained with additional specificity and detail in the accompanying drawings.

BRIEF DESCRIPTION OF THE DRAWINGS

These and other features, aspects, and advantages of certain embodiments of the present disclosure will be more apparent from the following detailed description taken in conjunction with the accompanying drawings in which like characters represent like parts throughout the drawings, and in which.

Figure 1:
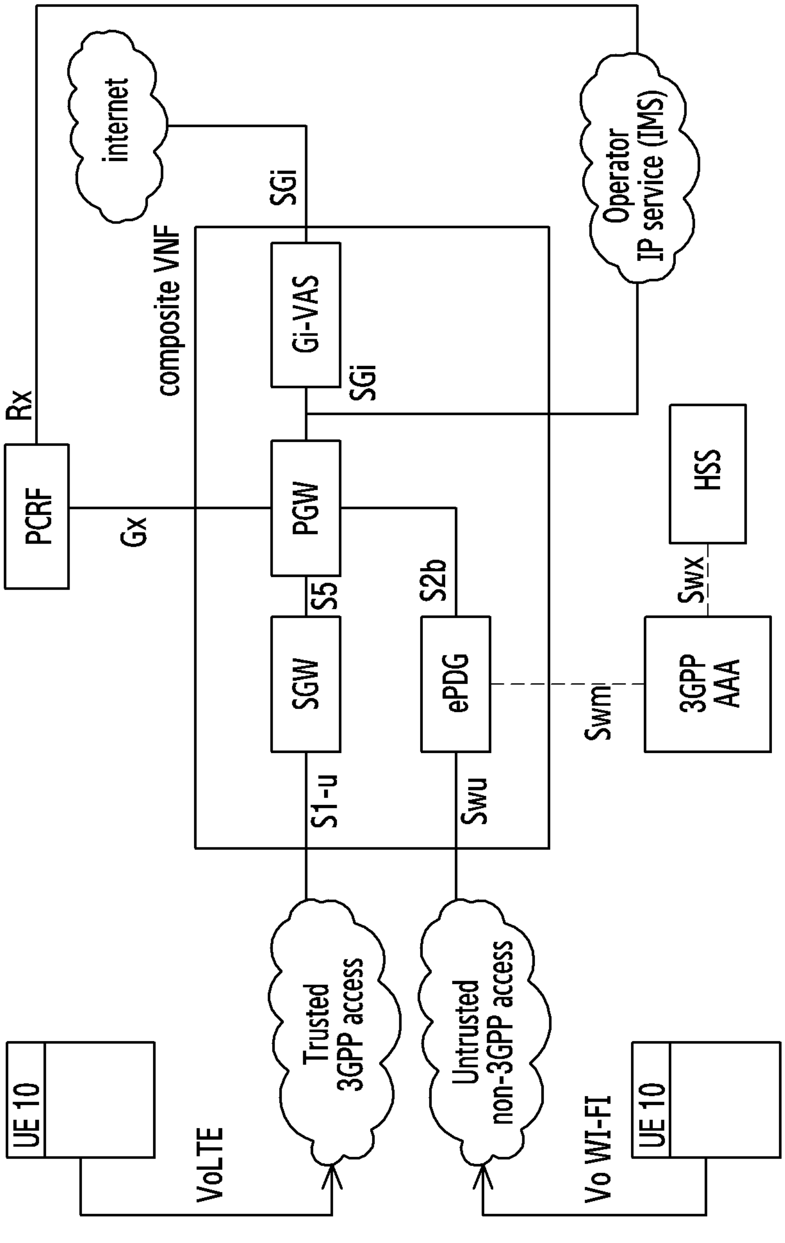
FIG. 1 (RELATED ART)
FIG. 1 is a block diagram illustrating a conventional Voice over Wi-Fi (VoWi-Fi) call system.

Further, skilled artisans will appreciate that elements in the drawings are illustrated for simplicity and may not have necessarily been drawn to scale. For example, the flowcharts illustrate example methods to help to improve understanding of aspects of the present disclosure. Furthermore, in terms of the construction of the device, one or more components of the device may have been represented in the drawings by conventional symbols, and the drawings may show various details that are pertinent to understanding the example embodiments of the present disclosure so as not to obscure the drawings with details that will be readily apparent to those of ordinary skill in the art having the benefit of the description herein.

DETAILED DESCRIPTION

Voice over Wireless Fidelity (VoWi-Fi) calling may refer, for example, to a technology that allows users to make and receive phone calls through a wireless internet connection, typically over a Wi-Fi network (e.g., 2.4 GHz, 5 GHZ, etc.). Instead of depending entirely on typical cellular networks (e.g., 4th Generation (4G) cellular network, 5th Generation (5G) cellular network, etc.), the VoWi-Fi call technology uses a Voice over Internet Protocol (VOIP) to transport voice data packets over the Internet. The VoWi-Fi call provides several advantages such as a cost reduction compared to the traditional cellular networks (e.g., expensive roaming charges, international call rates, etc.), a transition between the Wi-Fi network and traditional cellular networks when the users move out of a Wi-Fi range, switching a call from the Wi-Fi network to the traditional cellular networks, and so on.

Figure 2:
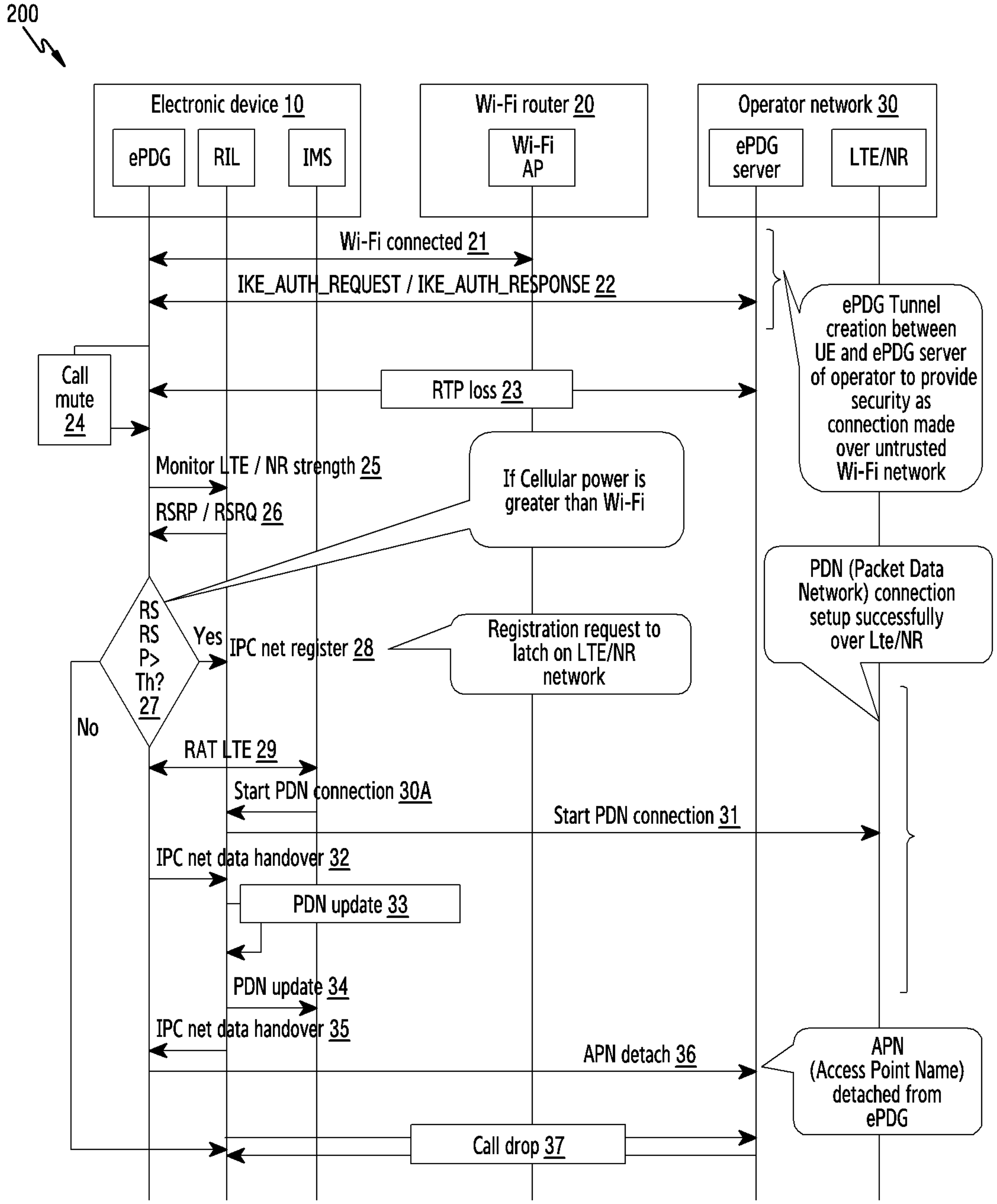
FIG.2 (RELATED ART)
FIG. 2 is a signal flow diagram illustrating a problem associated with the conventional VoWi-Fi call system for establishing a VoWi-Fi call.

While the VoWi-Fi call may offer several advantages, the VoWi-Fi call also has a few disadvantages. One such disadvantage is a call quality degradation in a certain conventional VoWi-Fi call system, as illustrated in FIG. 1, and as discussed later in the description. The VoWi-Fi call is strongly reliant on the quality and stability of the Wi-Fi network. The quality of the VoWi-Fi call can be degraded due to insufficient bandwidth, network congestion, or a weak Wi-Fi connection, resulting in speech distortions, delays, dropped audio, and the like. Additionally, the VoWi-Fi is affected due to interference from other devices and excessive network traffic, which degrades the user's experience. Additionally, another disadvantage is a call dropping in the certain conventional VoWi-Fi call system, as illustrated in FIG. 2, which may occur due to a variety of reasons such as a weak Wi-Fi signal, network instability, or a compatibility issue with specific Wi-Fi networks or user devices. This might result in a bad user experience. Additionally, another disadvantage of the VoWi-Fi call is latency and occurrence of jitter in the certain conventional VoWi-Fi call system, as illustrated in FIG. 2. The jitter may occur due to a variety of reasons such as a weak Wi-Fi signal, network instability, network congestion, signal interference, and so on. High latency can cause visible pauses between spoken words (call mutes), impairing real-time communication and the jitter refers to differences in packet arrival timings that result in irregular voice quality.

Moreover, each time a user device (e.g., smartphone) connects to the Wi-Fi network, a new IMS registration process is necessary to re-establish an Internet Protocol Security (IPsec) tunnel for call registration and re-establishment. This method takes additional time and demands additional signal processing, which is undesirable.

In an example, a user may have a dual-band Wi-Fi network (e.g., 2.4 GHz and 5 GHZ) and is roaming around the house while making the VoWi-Fi call. Due to the constant movement of the user, the quality of VoWi-Fi calls degrades due to moving between traditional cellular networks and Wi-Fi networks and/or between Wi-Fi channels, as the certain conventional VoWi-Fi call systems use only specified parameters (e.g., RSSI). In another example, where the user's device moves to a location that is outside the Wi-Fi range, the user's device may automatically fall back to the typical cellular networks, even if there was no degradation in call quality. This is because Wi-Fi RSSI ranges do not fulfill the required standards. If the user's device is within the Wi-Fi range, the call will be routed through the VoWi-Fi service on any open Wi-Fi channel. This is because the Wi-Fi RSSI ranges fulfill the required standards.

Thus, it is advantageous to address the above-mentioned disadvantages or other shortcomings or at least address enhancing the quality of the VoWi-Fi call.

For the purpose of promoting an understanding of the principles of the disclosure, reference will now be made to example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this disclosure to "an aspect", "another aspect" or similar language may refer, for example, to a particular feature, structure, or characteristic described in connection with the embodiment being included in at least one embodiment of the present disclosure. Thus, appearances of the phrase "in an embodiment", "in one embodiment", "in another embodiment", and similar language throughout this disclosure may, but do not necessarily, all refer to the same embodiment.

The terms "comprise", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. The various example embodiments described herein are not necessarily mutually exclusive, as various embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks that carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

FIG. 1 is a block diagram illustrating conventional Voice over Wi-Fi (VoWi-Fi) call system.

The conventional VoWi-Fi call system includes one or more modules to establish a VoWi-Fi call for a user of an electronic device (e.g., User Equipment (UE) 10). The one or more modules include a Serving Gateway (SGW) module, a PDN Gateway (PDW) module, a Gi-VAS module, an Evolved Packet Data Gateway (ePDG) module, a Policy, and Charging Rules Function (PCRF) module, a 3GPP Authentication, Authorization, and Accounting (AAA) module, a Home Subscriber Server (HSS) module, an internet module, and an Operator IP Service (IMS) module. The one or more modules are configured to work together to ensure seamless and secure connectivity for users making a VOLTE call or a VoWi-Fi call, regardless of whether they are accessing the network through trusted 3GPP access or untrusted non-3GPP access. The one or more modules are configured to handle different interfaces (e.g., S1-u, Swu, S5, S2b, Swm, Swx, Sgi, Gx, etc.) to enable the necessary functionalities for accessing the internet, operator IP services, and ensure proper policy control, authentication, and authorization.

The SGW module is configured to act as an anchor point for user data during the VOLTE call through the trusted 3GPP access or the VoWi-Fi call through untrusted non-3GPP access. The SGW module is configured to manage the user's data sessions, ensuring proper routing, and forwarding of packets between the electronic device 10 and the external networks or modules. Additionally, the SGW module is configured to utilize the S1-U interface to connect with the electronic device 10. The PGW module is configured to manage a connectivity of the user to external networks, such as the internet and operator IP services, during the VOLTE or VoWi-Fi call. The PGW module is configured to perform tasks such as IP address allocation, policy enforcement, and Quality of Service (QOS) management. Additionally, the PGW module is configured to utilize interfaces such as Ss, Gx, and Rx for connecting to external networks (e.g., IMS module) and the PCRF module. The PGW module is configured to utilize the Sgi interface to communicate with the Gi-VAS module, which facilitates the exchange of information, signaling, and data between the Gi-VAS platform and relevant network components (e.g., internet module and IMS module).

The ePDG module is configured to enable an establishment of secure connections for the VoWi-Fi calls over the untrusted non-3GPP access networks. The ePDG module is configured to perform tasks such as authentication, encryption, and tunneling mechanisms to ensure the confidentiality and integrity of the VoWi-Fi traffic. Additionally, the cPDG module is configured to utilize interfaces such as Swm, and Swu for connecting to the electronic device 10 and authentication servers (e.g., 3GPP AAA module). The PCRF module is configured to manage a policy and charging control during the VOLTE or VoWi-Fi call. The PCRF module is configured to determine and enforce policies related to Quality of Service (QOS), charging, and resource allocation based on network conditions and user profiles. Additionally, the PCRF module is configured to utilize the Rx interface for exchanging policy and charging information with the IMS module.

The Internet module is configured to serve as a gateway to the Internet and enable access to a wide range of online resources and services. The Internet module is configured to provide connectivity to external servers, databases, and applications that support the provision of value-added services during the VoWi-Fi calls. The IMS module is configured to manage an IP-based communication service(s) within the VoWi-Fi network. The 3GPP AAA server is configured to provide an authentication and authorization service(s) for the VOLTE or VoWi-Fi calls. The 3GPP AAA server is configured to verify an identity of the user, authorize access to the network resources, and maintain accounting records. Additionally, the 3GPP AAA server is configured to utilize the Swx interface to communicate with the HSS module. The HSS module is configured to store and manage subscriber-related information, including user profiles, authentication credentials, and service subscriptions. Additionally, the HSS module plays a crucial role in authenticating and authorizing users during the VOLTE or VoWi-Fi call.

FIG. 2 is a signal flow diagram illustrating a problem associated with the conventional VoWi-Fi call system 200 for establishing a VoWi-Fi call. The conventional VoWi-Fi call system 200 includes, for example, the electronic device 10, a Wi-Fi router 20, and an operator network 30.

At step 21, the electronic device 10 establishes a connection with the Wi-Fi router 20 to initiate the VoWi-Fi call. At step 22, the electronic device 10 sends an IKE_AUTH_REQUEST to an cPDG server of the operator network 30. After receiving the IKE_AUTH_REQUEST from the electronic device 10, the ePDG server of the operator network 30 sends an IKE_AUTH_RESPONSE to the electronic device 10. In other words, an ePDG tunnel is established between the electronic device 10 and the ePDG server to offer security as a connection is made over an untrusted Wi-Fi network, and the VoWi-Fi call is initiated through the ePDG tunnel. At steps 23 and 24, the electronic device 10 detects that the VoWi-Fi call has been muted or that Real-Time Transport Protocol (RTP) packet loss has occurred, which may occur due to a variety of reasons such as a weak Wi-Fi signal, a network instability, a network congestion, a signal interference, a compatibility issue with specific Wi-Fi networks or devices, and so on. At steps 25 and 26, upon detecting that the VoWi-Fi call has been muted or that RTP packet loss has occurred, the electronic device 10 monitors an LTE/NR signal using a Radio Interface Layer (RIL) of the electronic device 10. The electronic device 10 determines one or more parameters associated with the LTE/NR signal (e.g., RSRP, RSRQ, etc.)

At step 27, the electronic device 10 determines whether the one or more parameters associated with the LTE/NR signal are greater than one or more parameters associated with the Wi-Fi router 20. The electronic device 10 identifies a call drop associated with the established VoWi-Fi call in response to determining that the one or more parameters associated with the Wi-Fi router 20 are greater than the one or more parameters associated with the LTE/NR signal, as illustrated in step 37, which is undesirable. At steps 28, 29, 30A, 31, 32, 33, 34, 35 and 36, the electronic device 10 camps on a cellular network (e.g., LTE/NR network) associated with the operator network 30 by performing one or more steps in response to determining that the one or more parameters associated with the LTE/NR signal are greater than one or more parameters associated with the Wi-Fi router 20. The one or more steps comprise sending an IPC net register request 28, sending a RAT LTE signal 29, establishing a PDN connection 30/31 with the cellular network (e.g., LTE, NR, etc.), transferring IPC net data 32 from the cPDG entity of the electronic device 10 to a RIL entity of the electronic device 10, updating the PDN 33 by the RIL entity of the electronic device 10, sending the updated PDN 34 from the RIL entity of the electronic device 10 to an IMS entity of the electronic device 10, transferring IPC net data 35 from the RIL entity of the electronic device 10 to the PDG entity of the electronic device 10, and sending an APN detach request to the ePDG server.

In the conventional VoWi-Fi call system 200, the one or more steps may increase signalling and processing between the multiple entities (e.g., UE 10, the operator network 30) to switch the VoWi-Fi call, which is not desirable. Additionally, there is degradation in the quality of the VoWi-Fi call due to switching among the cellular network and Vo-Wi-Fi network (e.g., 2.4 GHz or 5 GHz network) (or vice versa), there is no seamless switching between Wi-Fi channels based on cPDG call quality parameters (e.g., DPD, RTP packet loss, etc.).

To address these challenges, a disclosed method provides a unique strategy for enhancing the quality of the VoWi-Fi call, as described in greater detail below with reference to FIG. 3 to FIG. 9C.

Referring now to the drawings, and more specifically to FIGS. 3 to 9C, where similar reference characters refer to equivalent aspects throughout the figures, various example embodiments are illustrated.

Figure 3:
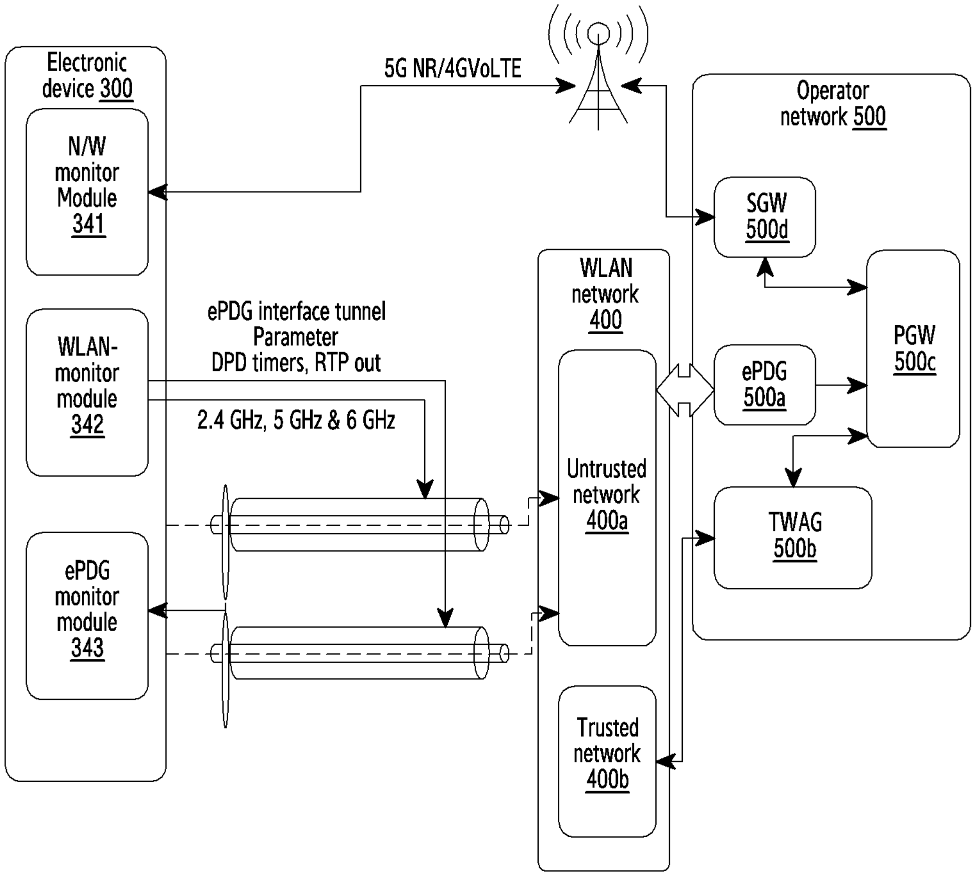
FIG. 3 is a block diagram illustrating an example configuration of a system environment for enhancing a quality of the VoWi-Fi call, according to various embodiments.

FIG. 3 is a block diagram illustrating an example configuration of a system environment for enhancing the quality of the VoWi-Fi call, according to various embodiments. The system includes a UE 300, a WLAN network 400, and an operator network 500.

The electronic device 300 is configured to establish a connection to the WLAN network 400 and the operator network 500 via various network services (e.g., untrusted network 400*a*, trusted network 400*b*, cellular network, etc.). The WLAN network 400 comprises the untrusted network 400*a* and the trusted network 400*b*. The untrusted network 400*a* is accessible to the public and is not secure. The untrusted network 400*a* is configured to provide wireless connectivity to the electronic device 300 and route traffic between the electronic device 300 and other network elements (e.g., cPDG). However, the untrusted network 400*a* does not offer any inherent security features, making it susceptible to potential security threats. The trusted network 400*b* is secure compared to the untrusted network 400*a*. The trusted network 400*b* is configured to ensure the confidentiality, integrity, and availability of data transmitted over the network. The trusted network 400*b* employs various security mechanisms, such as encryption and authentication, to protect sensitive information and prevent unauthorized access.

The operator network 500 comprises an Evolved Packet Data Gateway (ePDG) server 500*a*, a Trusted Wireless Access Gateway (TWAG) server 500*b*, a Packet Data Network Gateway (PGW) server 500*c*, and a Serving Gateway (SGW) server 500*d*. Each server may perform various functionalities to establish the VoWi-Fi call with the electronic device 300, which are given below.

a. The ePDG server 500*a* acts as an interface between the WLAN network 400 and the operator network 500. The ePDG server 500*a* is configured to authenticate and authorize the electronic device 300, establish secure tunnels for data transmission, and facilitate seamless handover between different network types.

b. The TWAG server 500*b* plays a role in securely connecting the electronic device 300 to the operator network 500. The TWAG server 500*b* is configured to manage user traffic, enforce Quality of Service (QOS) policies, and provide secure access to various network services.

c. The PGW server 500*c* acts as the gateway between the operator network 500 and external networks, such as the Internet. The PGW server 500*c* is configured to route data packets, allocate IP addresses, implement Network Address Translation (NAT), and enforce policies for data traffic management.

d. The SGW server 500*d* is configured to handle the routing and forwarding of data packets within the operator network 500. The SGW server 500*d* is configured to manage mobility and session management for the electronic device 300, ensure efficient data transfer, and optimize network performance.

Figure 9A:
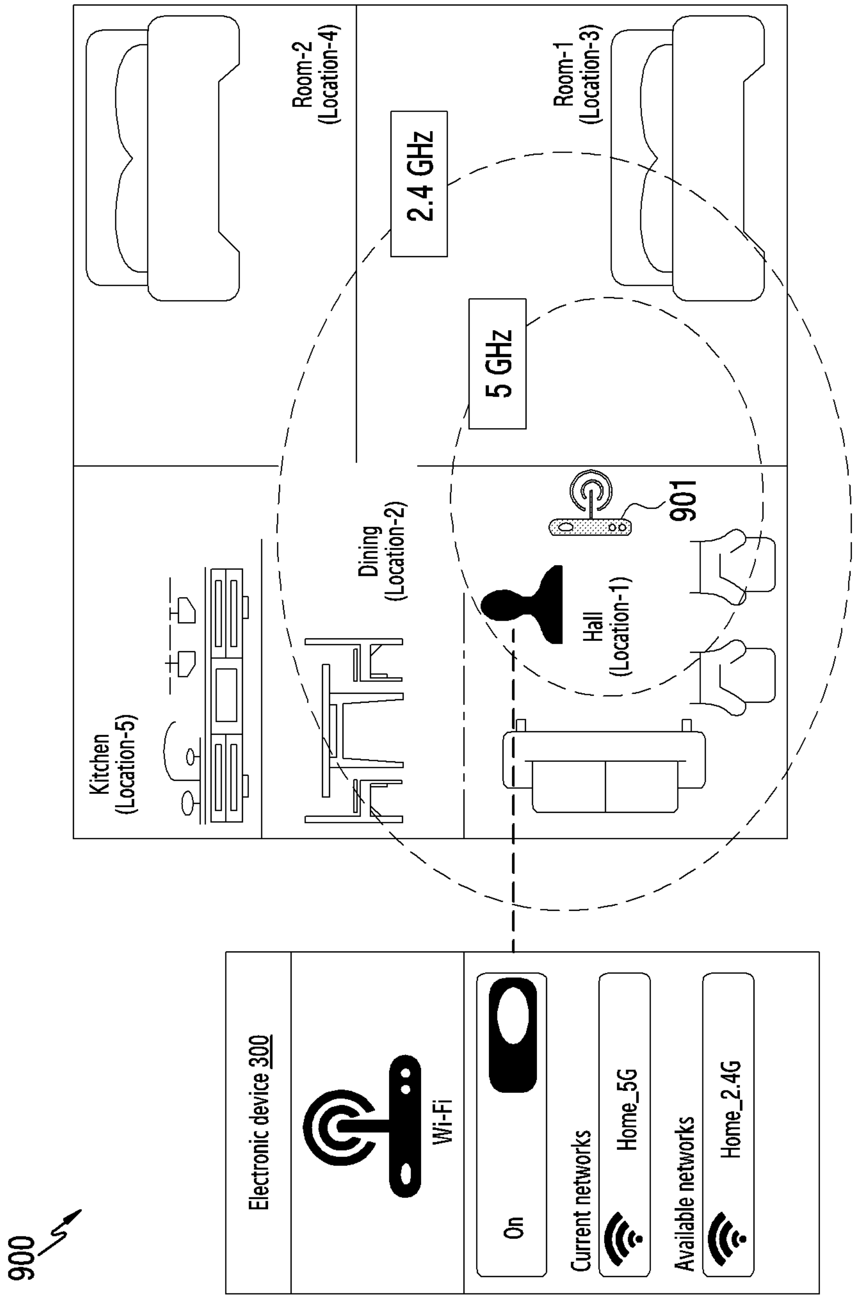
FIGS. 9A, 9B and 9C are diagrams illustrating an example scenario for a seamless voice communication where a user of the electronic device is moving around a house while making the VoWi-Fi call, according to various embodiments.
Figure 9B:
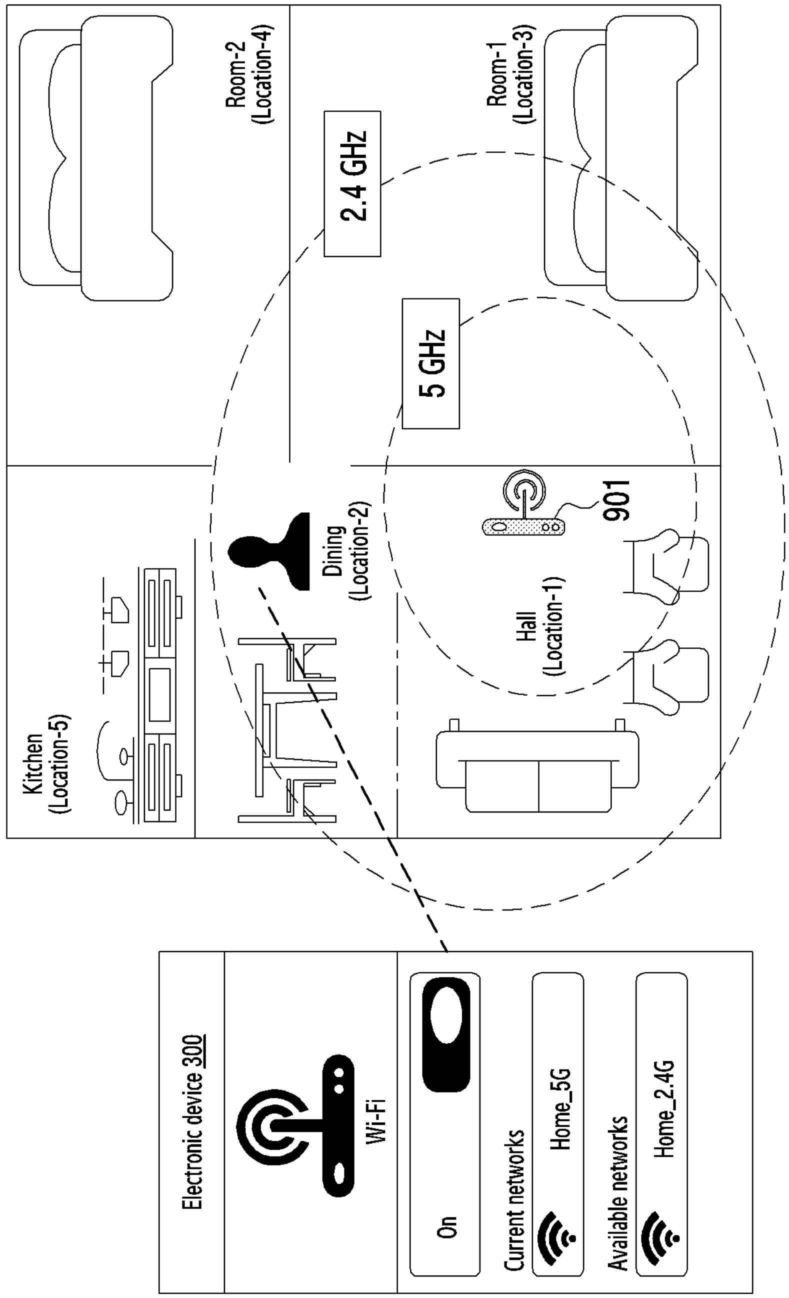
Figure 9C:
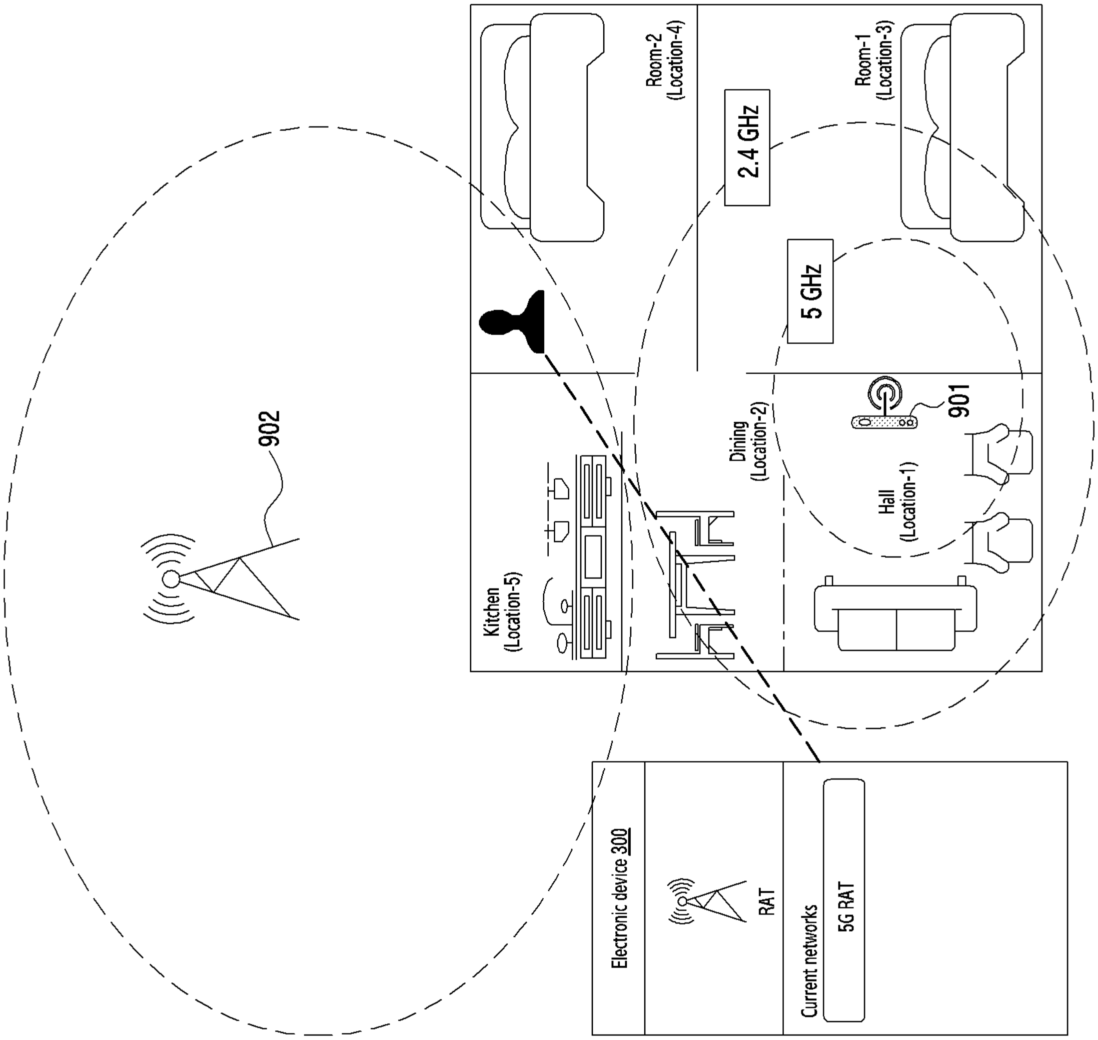

In various embodiments, the electronic device 300 includes a network monitor module 341, a WLAN monitor module 342, and an ePDG monitor module 343. Each of the various modules may include various circuitry and/or executable program instructions. The electronic device 300 may utilize these modules to enhance the quality of the VoWi-Fi call, as illustrated in FIGS. 9A, 9B and 9C.

In various embodiments, the network monitor module 341 may configured to monitor one or more Radio Access Technology (RAT) parameters associated with a cellular network or RAT node (e.g., LTE, 5G/NR). Examples of the one or more RAT parameters may include, but are not limited to, Reference Signal Received Power (RSRP) and Reference Signal Received Quality (RSRQ). The network monitor module 341 is further configured to determine a RAT score based on the one or more Radio Access Technology (RAT) parameters by utilizing one or more modules associated with the network monitor module 341, as described in greater detail below with reference to FIG. 5.

In various embodiments, the WLAN monitor module 342 is configured to monitor one or more Wi-Fi channel parameters associated with a plurality of WLANs (e.g., first WLAN as 2.4. GHz, second WLAN as 5 GHZ, etc.) associated with a node (e.g., router) of a network. Examples of the one or more Wi-Fi channel parameters may include, but are not limited to, Received Signal Strength Indicator (RSSI) and Real-time Transport Protocol (RTP) packet loss. These parameters are required to know whether an ePDG is available over a WLAN channel or not. The WLAN monitor module 342 is further configured to determine a WLAN score for each WLAN of the plurality of WLANs based on the one or more corresponding Wi-Fi channel parameters by utilizing one or more modules associated with the WLAN monitor module 342, as described in greater detail below with reference to FIG. 5.

In various embodiments, the ePDG monitor module 343 is configured to monitor and assess the quality of the VoWi-Fi call by analyzing one or more ePDG interface tunnel parameters associated with a plurality of ePDG interface tunnels. Examples of the one or more ePDG interface tunnel parameters may include, but are not limited to, the RSSI, the RTP packet loss, a Dead Peer Detection (DPD) timer expiry, and a motion associated with the electronic device 300. The cPDG monitor module 343 is further configured to migrate the VoWi-Fi call (voice communication), as described in greater detail below with reference to FIG. 5, based on one or more conditions as described below, a. Monitoring the one or more ePDG interface tunnel parameters during the VoWi-Fi call to identify whether any changes occur in the one or more ePDG interface tunnel parameters based on a predetermined threshold ePDG interface.

b. Determining the one or more Wi-Fi channel parameters of the Wi-Fi channel used for the VoWi-Fi call.

c. If the one or more Wi-Fi channel parameters fall within the predetermined threshold cPDG interface, the cPDG interface is switched through the channel.

d. If the one or more Wi-Fi channel parameters do not fall within the predetermined threshold cPDG interface, the VoWi-Fi call is transferred to the cellular network.

Figure 4:
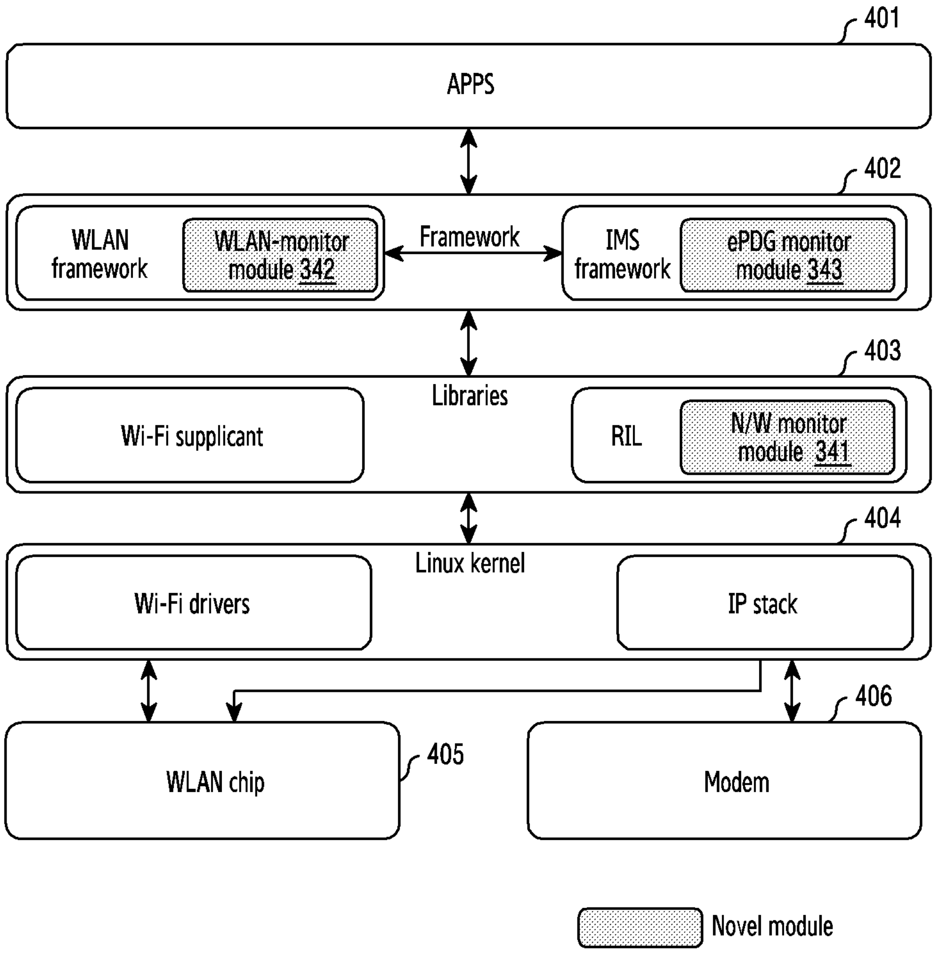
FIG. 4 is a diagram illustrating an example network configuration of an electronic device including one or more modules to enhance the quality of the VoWi-Fi call, according to various embodiments.

FIG. 4 is a diagram illustrating an example network configuration of an electronic device 300 including one or more modules to enhance the quality of the VoWi-Fi call, according to various embodiments. There are several layers involved in the conventional architecture for establishing the VoWi-Fi call, such as an application layer 401, a framework layer 402, a libraries layer 403, and a Linux kernel layer 404. Each layer has a distinct functionality to establish the VoWi-Fi call, which is listed below.

The application layer 401 may include a plurality of applications running on the electronic device 300. The plurality of applications may utilize the functionalities provided by the underlying layers to perform various tasks, including making the VoWi-Fi call. For example, a Voice over Internet Protocol (VOIP) application on the electronic device 300 can use the lower layers to establish and manage Vo Wi-Fi calls. The framework layer 402 may provide higher-level functionalities and Application Programming Interfaces (APIs) for the plurality of applications. The framework layer 402 may include, for example, two main frameworks relevant to the VoWi-Fi call, which are listed below.

a. WLAN framework: the WLAN framework is configured to handle an interaction between the Wi-Fi capabilities and the plurality of applications of the electronic device 300. Additionally, the WLAN framework is configured to manage Wi-Fi connections, scan for available networks, and provide the necessary interfaces for the plurality of applications to initiate the VoWi-Fi call. In various embodiments, the WLAN framework includes the WLAN monitor module 342. The WLAN monitor module 342 is configured to monitor the one or more Wi-Fi channel parameters associated with the plurality of WLANs associated with the node. These parameters are required to know whether an ePDG is available over a WLAN channel or not. The WLAN monitor module 342 is further configured to determine the WLAN score for each WLAN of the plurality of WLANs based on the one or more corresponding Wi-Fi channel parameters by utilizing one or more modules associated with the WLAN monitor module 342, as described in greater detail below with reference to FIG. 5.

b. IP Multimedia Subsystem (IMS) framework: The IMS framework is configured to handle multimedia services, including VOIP calls, over IP networks. Additionally, the IMS framework is configured to provide the necessary interfaces and protocols to establish and manage the VoWi-Fi call using the IMS technology. In various embodiments, the IMS framework includes the ePDG monitor module 343. The PDG monitor module 343 is configured to monitor and assess the quality of the VoWi-Fi call by analyzing the one or more ePDG interface tunnel parameters associated with the plurality of ePDG interface tunnels. The ePDG monitor module 343 is further configured to migrate the VoWi-Fi call (voice communication), as described in greater detail below with reference to FIG. 5, based on the one or more conditions (e.g., predetermined threshold ePDG interface).

The libraries layer 403 may include key software libraries that support the functionalities of the upper layers. In the context of the VoWi-Fi call, two important libraries are listed below.

a. Wi-Fi supplicant: the Wi-Fi supplicant library may interact with the Wi-Fi drivers and handles the low-level Wi-Fi functionalities, such as connecting to Wi-Fi networks, authentication, and encryption. The Wi-Fi supplicant may enable the device to establish a connection with a Wi-Fi access point (e.g., node) for the VoWi-Fi call.

b. Radio Interface Layer (RIL): The RIL library may act as an interface between the Android telephony framework and a modem 406. The RIL library may facilitate communication with the modem 406 to handle voice calls, including the VoWi-Fi call. In various embodiments, the RIL library includes the network monitor module 341. The network monitor module 341 is configured to monitor the one or more Radio Access Technology (RAT) parameters associated with the cellular network or RAT node. The network monitor module 341 is further configured to determine the RAT score based on the one or more RAT parameters by utilizing one or more modules associated with the network monitor module 341, as described in in greater detail below with reference to FIG. 5.

The modem 406 may include an Original Equipment Manufacturer (OEM) client library. Additionally, the modem 406 may track one or more values of RSRP/RSRQ from one or more sensors and notify the one or more values to RIL library and thereafter RIL library may notify same to the network monitor module 341.

The Linux kernel layer 404 may form a core of an operating system (e.g., Android operating system). The Linux kernel layer 404 may include components for the functionality of the electronic device 300, including Wi-Fi and networking capabilities. In the context of the VoWi-Fi call, two components are relevant, which are listed below.

a. Wi-Fi drivers: The Wi-Fi drivers are configured to facilitate communication between the device and a WLAN chip 405. Additionally, the Wi-Fi drivers are configured to handle the low-level operations related to Wi-Fi, such as transmitting and receiving data, managing Wi-Fi connections, and interacting with the higher layers.

b. IP Stack: The IP stack is configured to manage network protocols and routing data packets. Additionally, the IP stack is configured to handle the communication between the device, the WLAN chip 405, and the modem 406, ensuring proper data flow during the VoWi-Fi call.

In an example scenario, a user wants to make the VoWi-Fi call using the device. The user may launch a VoIP application and select a contact for the VoWi-Fi call. The VOIP application may interact with the WLAN framework to initiate the VoWi-Fi call and establish the Wi-Fi connection. The Wi-Fi supplicant may handle the authentication and encryption process to connect the device to the desired Wi-Fi access point. The RIL may communicate with the modem 406 to establish the connections for the VoWi-Fi call. The Wi-Fi drivers may enable the device to communicate with the WLAN chip 405, ensuring smooth data transmission. Simultaneously, the IP Stack may manage the network protocols, routing data packets between the WLAN chip 405, the modem 406, and the VOIP application. Through the collective functionality of the layers and their components, the device may successfully establish and maintain the VoWi-Fi call, enabling the user to communicate over the Wi-Fi network instead of traditional cellular networks.

Figure 5:
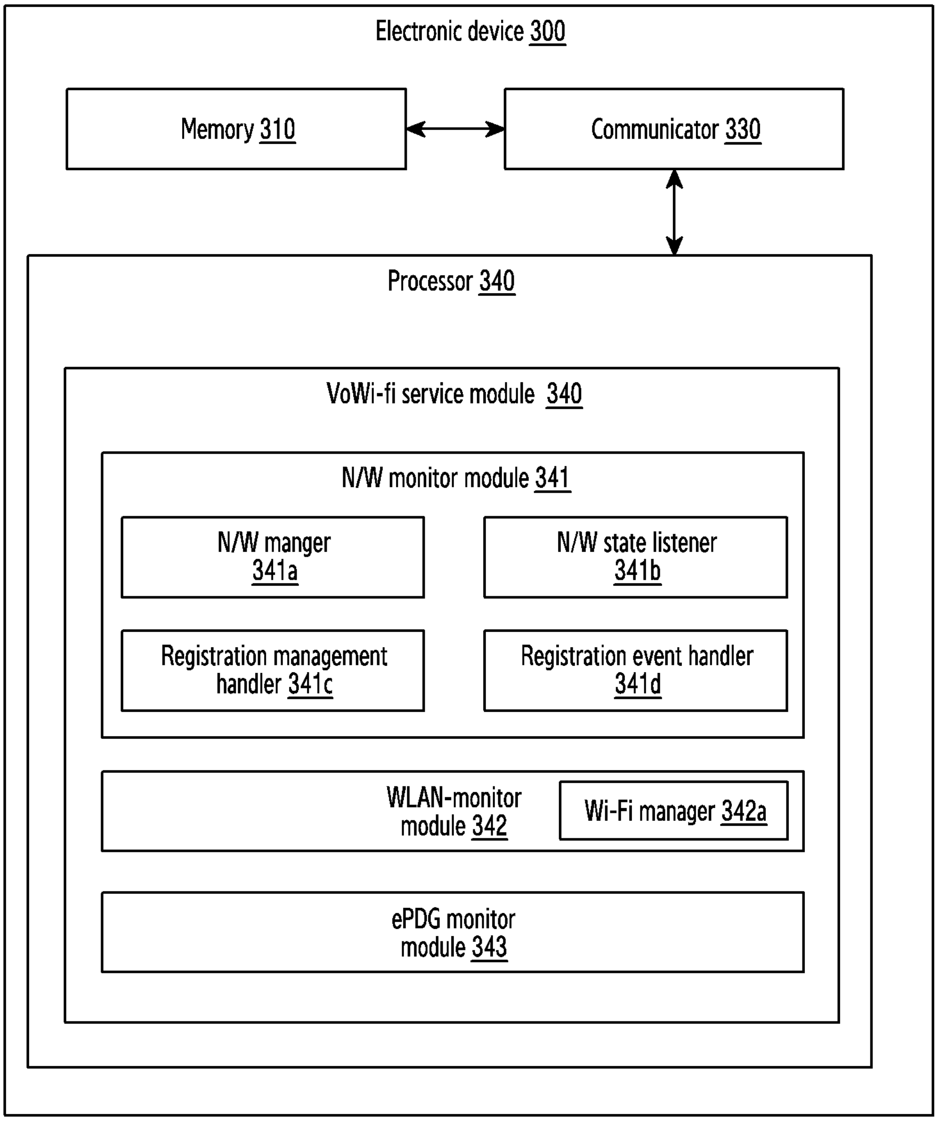
FIG. 5 is a block diagram illustrating an example configuration of an electronic device for enhancing the quality of the VoWi-Fi call, according to various embodiments.

FIG. 5 is a block diagram illustrating an example configuration of the electronic device 300 for enhancing the quality of the VoWi-Fi call, according to various embodiments. Examples of the electronic device 300 may include, but are not limited to a smartphone, a tablet computer, a Personal Digital Assistance (PDA), an Internet of Things (IoT) device, a wearable device, etc.

In an embodiment, the electronic device 300 comprises a memory 310, a processor (e.g., including processing circuitry and may referred to herein as a controller) 320, and a communicator (e.g., including communication circuitry) 330. The processor 320 may a VoWi-Fi service module (e.g., including various processing circuitry and/or executable program instructions) 340.

In an embodiment, the memory 310 stores instructions to be executed by the processor 320 for enhancing the quality of the VoWi-Fi call, as discussed throughout the disclosure.

The memory 310 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 310 may, in some examples, be considered a non-transitory storage medium. The term "non-transitory" may indicate that the storage medium is not embodied in a carrier wave or a propagated signal. However, the term "non-transitory" should not be interpreted as the memory 310 is non-movable. In some examples, the memory 310 can be configured to store larger amounts of information than the memory. In certain examples, a non-transitory storage medium may store data that can, over time, change (e.g., in Random Access Memory (RAM) or cache). The memory 310 can be an internal storage unit, or it can be an external storage unit of the electronic device 300, a cloud storage, or any other type of external storage.

The processor 320 may include various processing circuitry (as used herein, including the claims, the term "processor", "controller" or the like, may include various processing circuitry, including at least one processor (or controller), wherein one or more processors (or controllers) of the at least one processor (or controller) may be configured to perform the various functions described herein) and communicates with the memory 310, the communicator 330, and the VoWi-Fi service module 340. The processor 320 is configured to execute instructions stored in the memory 310 and to perform various processes for enhancing the quality of the VoWi-Fi call, as discussed throughout the disclosure. The processor 320 may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial Intelligence (AI) dedicated processor such as a neural processing unit (NPU).

The communicator 330 may include various communication circuitry and is configured for communicating internally between internal hardware components and with external devices (e.g., server) via one or more networks (e.g., radio technology). The communicator 330 may include an electronic circuit specific to a standard that enables wired or wireless communication.

The VoWi-Fi service module 340 (and the various modules illustrated as being a part thereof) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In various embodiments, the VoWi-Fi service module 340 includes the network (N/W) monitor module 341, the WLAN monitor module 342, and the cPDG monitor module 343.

In various embodiments, the network monitor module 341 is configured to monitor the one or more RAT parameters associated with the cellular network or RAT node (e.g., LTE, 5G/NR). Examples of the one or more RAT parameters may include, but are not limited to, the RSRP and the RSRQ. The network monitor module is further configured to determine the RAT score based on the one or more RAT parameters by utilizing one or more modules associated with the network monitor module. The network monitor module 341 may include a network manager 341*a*, a network state listener 341*b*, a registration management handler 341*c*, and a registration event handler 341*d*.

In various embodiments, the network manager 341*a* is configured to process one or more telephony requests. In other words, when a new telephony request arrives, either from a telephony framework or from an OEM client (OEM client library), an event is dispatched to the network manager 341*a*, where the event may associate with a lower layer (e.g., OEM) and/or telephony framework layer. The event triggers the network manager 341*a* to interact with a modem layer (e.g., modem 406), facilitating the necessary actions to fulfill the new telephony request. The network state listener 341*b* is configured to directly listen to all the Notify ( ) signals sent by the network manager 341*a*. Upon receiving the event, the network state listener 341*b* is further configured to relay the same to the registration event handler 341*d* through the registration management handler 341*c*. The network state listener 341*b* is further configured to remain in a constant listening mode to detect any state changes, whereas the registration event handler 341*d* is specifically triggered when desired values, such as RSRP and RSRQ, undergo modifications and require monitoring.

In various embodiments, the registration management handler 341*c* is configured to act as a receiver for the network state listener's events and registers relevant observers to monitor the network changes. The registration management handler 341*c* is configured to listen for network events. The network events may indicate change in a network state, such as RSRP and RSRQ values, are captured at the modem layer 406 and propagated as events to higher layers. Upon detecting the network events, the registration management handler 341*c* is configured to send an event of network type change to the registration event handler 341*d*.

In various embodiments, the registration management handler 341*c* may include an Android framework design that aids in the registration of observers to the state listener. In other words, the electronic device 300 may include two processors, such as an Application Processor (AP) and Communication Processor (CP). Applications are handled by the AP, while communication with the network is handled by the CP. All network circumstances are gathered at the CP and must be propagated to the AP to the network monitor module 341. This propagation is implemented using an observer design pattern, which necessitates the use of handlers and listeners (e.g., network state listener 341*b*).

In various embodiments, the WLAN monitor module 342 is configured to monitor the one or more Wi-Fi channel parameters associated with the plurality of WLANs (e.g., first WLAN as 2.4. GHz, second WLAN as 5 GHz, etc.) associated with the node (e.g., router) of the network. Examples of the one or more Wi-Fi channel parameters may include, but are not limited to, the RSSI, the RTP packet loss, and a type of Wi-Fi network. These parameters are required to know whether the cPDG is available over the WLAN channel or not. The WLAN monitor module 342 is further configured to determine the WLAN score for each WLAN of the plurality of WLANs based on the one or more corresponding Wi-Fi channel parameters by utilizing one or more modules associated with the WLAN monitor module 342.

In various embodiments, the WLAN monitor module 342 may include a Wi-Fi manager 342*a*. The Wi-Fi manager 342*a* is configured to provide a crucial service and framework component that enables applications to access and utilize Wi-Fi-related functionality through the Wi-Fi drivers.

The Wi-Fi manager 342*a* is further configured to manage link connectivity and different networks, ensuring seamless connectivity for the users. Moreover, the Wi-Fi manager is configured to implement a mechanism that shares information from the Wi-Fi framework (WLAN framework) to the IMS framework, where it is utilized for a score calculation (e.g., WLAN score, VoWi-Fi migration score, etc.). This feature enhances the overall user experience by providing a more accurate score calculation.

In various embodiments, the cPDG monitor module 343 is configured to detect, using an evolved Packet Data Gateway (cPDG) interface, the voice communication over a first wireless local area network (WLAN) among the plurality of WLANs associated with the node of the network. The cPDG monitor module 343 is further configured to detect whether the electronic device 300 is in the motion by monitoring sensor data of the electronic device 300 by utilizing one or more sensors of the electronic device 300 (e.g., accelerometer). The ePDG monitor module 343 is further configured to determine the one or more ePDG interface tunnel parameters associated with the plurality of WLANs in response to determining that the electronic device 300 is in motion. Examples of the one or more ePDG interface tunnel parameters may include, but are not limited to, the RSSI, the RTP packet loss, and the DPD timer expiry.

In various embodiments, the cPDG monitor module 343 is configured to establish, upon detecting a change in the one or more determined ePDG interface tunnel parameters, the voice communication. The cPDG monitor module 343 may execute multiple operations to establish the voice communication, which are illustrated, by way of non-limiting example below.

The ePDG monitor module 343 is configured to determine whether a value of the one or more ePDG interface tunnel parameters associated with a first ePDG interface tunnel of the plurality of ePDG interface tunnels is greater than a threshold (predetermined threshold cPDG interface). The PDG monitor module 343 is configured to:

a. Establish the voice communication on the first ePDG interface tunnel in response to determining that the value of the one or more ePDG interface tunnel parameters associated with the first ePDG interface tunnel is greater than the threshold; or b. Establish the voice communication on a second ePDG interface tunnel of the plurality of cPDG interface tunnels in response to determining that the value of the one or more cPDG interface tunnel parameters associated with the first ePDG interface tunnel is lower than the threshold.

In various embodiments, the ePDG monitor module 343 is configured to establish, upon detecting the change in the one or more determined ePDG interface tunnel parameters, the voice communication using a second WLAN among the plurality of WLANs to enhance the quality of the VoWi-Fi call. The cPDG monitor module 343 may execute multiple steps to establish the voice communication, which are given below.

The ePDG monitor module 343 is further configured to determine a corresponding VoWi-Fi migration score for a corresponding WLAN based on a correlation of the one or more determined ePDG interface tunnel parameters and the one or more Wi-Fi channel parameters associated with the corresponding WLAN by utilizing the WLAN-monitor module 342. The cPDG monitor module 343 is further configured to determine the RAT score of the RAT node associated with the electronic device 300 by utilizing the network monitor module 341. The cPDG monitor module 343 is further configured to migrate, based on a highest VoWi-Fi migration score among the corresponding VoWi-Fi migration score and the determined RAT score, by the electronic device 300, the voice communication from the first WLAN to the second WLAN of the plurality of WLANs or the RAT node to enhance the quality of the VoWi-Fi call. The ePDG monitor module 343 may execute multiple steps to migrate the voice communication from the first WLAN to the second WLAN of the plurality of WLANs or the RAT node to enhance the quality of the VoWi-Fi call, which are given below.

The cPDG monitor module 343 is further configured to determine whether the determined RAT score is greater than the determined VoWi-Fi migration score. The ePDG monitor module 343 is further configured to:

a. Migrate to the RAT node from the first WLAN in response to determining that the determined RAT score is greater than the determined VoWi-Fi migration score; or b. Migrate to an optimal WLAN among the plurality of WLANs associated with the node of the network in response to determining that the determined RAT score is lower than the determined VoWi-Fi migration score. The optimal WLAN comprises one of the first WLAN or the second WLAN that has the highest VoWi-Fi migration score among the corresponding VoWi-Fi migration scores.

In various embodiments, the cPDG monitor module 343 is configured to perform the voice communication corresponding to the VoWi-Fi communication. The cPDG monitor module 343 is further configured to pause, upon detecting the active communication, by the electronic device 300, one or more Wi-Fi sockets for all ongoing communication associated with one or more applications of the electronic device 300 excluding the VoWi-Fi communication.

In various embodiments, the cPDG monitor module 343 is configured to detect a change in connection from the first WLAN to the second WLAN. The cPDG monitor module 343 is further configured to update an active IP address of the first WLAN to the second WLAN to maintain the ePDG interface over the second WLAN within the network without initiating a new registration mechanism for the second WLAN.

A function associated with the various components of the electronic device 300 may be performed through the non-volatile memory, the volatile memory, and the processor 320. One or a plurality of processors controls the processing of the input data in accordance with a predefined (e.g., specified) operating rule or AI model stored in the non-volatile memory and the volatile memory to predict change in network conditions caused by the motion of the electronic device 300, such as RSSI of linked Wi-Fi, cellular network strength, and so on. The predefined operating rule or AI model is provided through training or learning. Here, being provided through learning may refer, for example, to, by applying a learning mechanism to a plurality of learning data, a predefined operating rule or AI model of the desired characteristic being made. The learning may be performed in a device itself in which AI according to an embodiment is performed, and/or may be implemented through a separate server/system. The learning mechanism may train on a predetermined target device (for example, a robot) using a plurality of learning data to cause, allow, or control the target device to decide or predict. Examples of learning mechanisms include, but are not limited to, supervised learning, unsupervised learning, semi-supervised learning, or reinforcement learning.

The AI model may include a plurality of neural network layers. Each layer may have a plurality of weight values and performs a layer operation through a calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), deep Q-networks, or the like.

Although FIG. 5 illustrates various hardware components of the electronic device 300, it is to be understood that various embodiments are not limited thereon. In various embodiments, the electronic device 300 may include less or more number of components. Further, the labels or names of the components are used only for illustrative purposes and do not limit the scope of the disclosure. One or more components can be combined to perform the same or substantially similar functions to enhance the quality of the VoWi-Fi call.

Figure 6A:
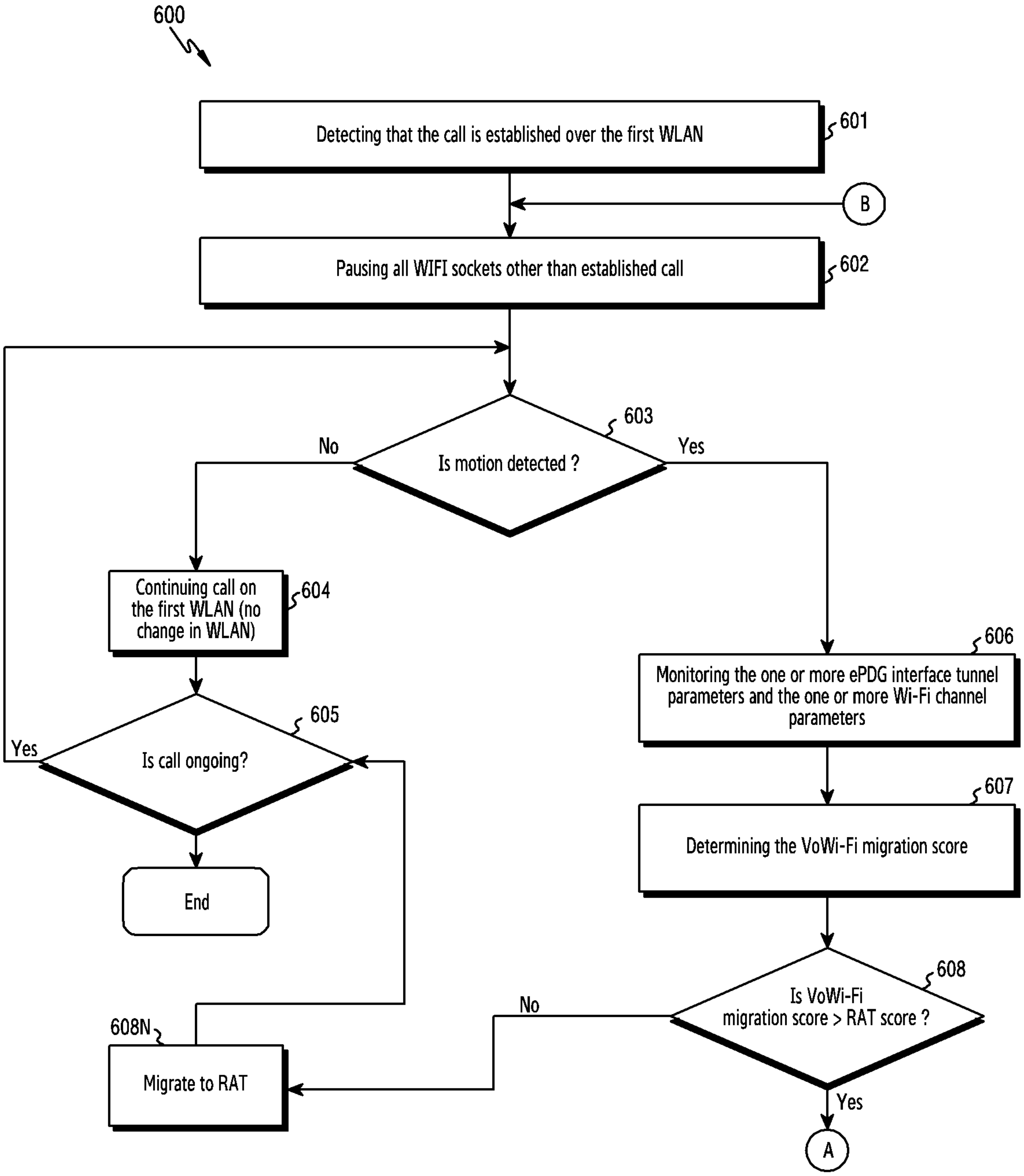
FIGS. 6A and 6B are flowcharts illustrating an example method for enhancing the quality of the VoWi-Fi call, according to various embodiments.
Figure 6B:
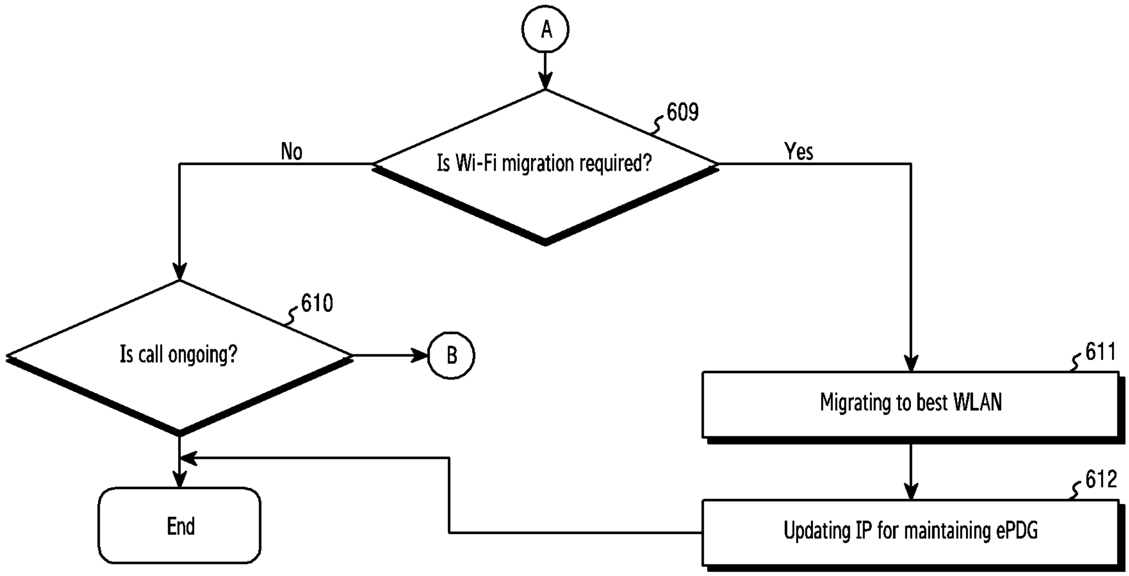

FIGS. 6A and 6B are flowcharts illustrating an example method 600 for enhancing the quality of the VoWi-Fi call, according to various embodiments.

At 601, the method 600 includes detecting that the VoWi-Fi call is established over the first WLAN. At 602, the method 600 includes pausing, upon detecting the established VoWi-Fi call, all WIFI sockets other than the established call. At 603, the method 600 includes determining whether any motion associated with the user of the electronic device 300 is detected. At 604, the method 600 includes continuing the established VoWi-Fi call using the first WLAN in response to determining that motion associated with the user of the electronic device 300 is not detected. At 605-603, the method 600 includes continuously monitoring an ongoing VoWi-Fi call and determining whether motion associated with the user of the electronic device 300 is detected during the ongoing VoWi-Fi call.

At 606, the method 600 includes monitoring the one or more ePDG interface tunnel parameters and the one or more Wi-Fi channel parameters in response to determining that motion associated with the user of the electronic device 300 is detected. At 607, the method 600 includes determining the VoWi-Fi migration score based on the one or more ePDG interface tunnel parameters and the one or more Wi-Fi channel parameters. At 608, the method 600 includes determining whether the determined VoWi-Fi migration score is greater than the RAT score. At 608N, the method 600 includes migrating the ongoing VoWi-Fi call to the RAT node from the first WLAN in response to determining that the determined RAT score is greater than the determined VoWi-Fi migration score and processing one or more operations (steps) as illustrated in FIG. 6A.

At 609, the method 600 includes determining whether the Wi-Fi migration is required based on the one or more ePDG interface tunnel parameters and the one or more Wi-Fi channel parameters. At 610, the method 600 includes continuously monitoring the ongoing VoWi-Fi call in response to determining that the Wi-Fi migration is not required and processing one or more operations (steps) as illustrated in FIG. 6B and FIG. 6A. At 611, the method 600 includes migrating to the optimal WLAN among the plurality of WLANs associated with the node of the network in response to determining that the Wi-Fi migration is required. At 612, the method 600 includes updating the IP for maintaining the ePDG tunnel/interface.

Figure 7A:
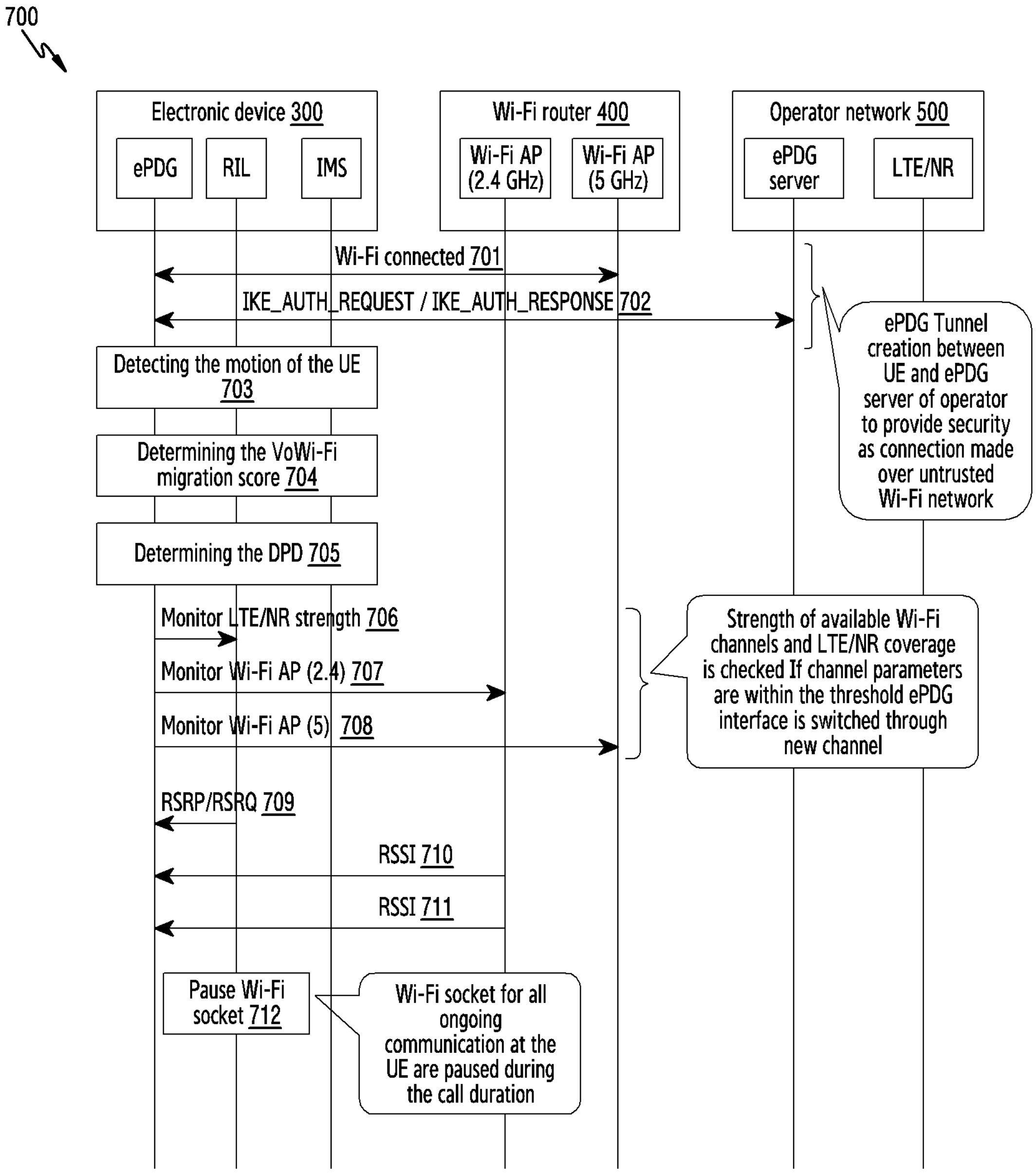
FIGS. 7A and 7B are signal flow diagrams illustrating an example method for migrating a voice communication from a first WLAN to a second WLAN, according to various embodiments.
Figure 7B:
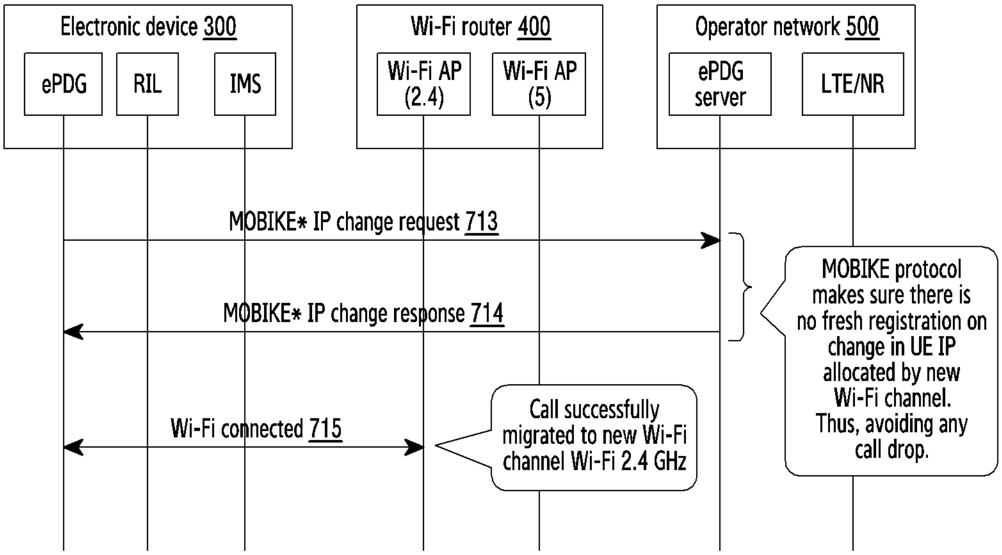

FIGS. 7A and 7B is a signal flow diagram illustrating an example method 700 for migrating the voice communication from the first WLAN (e.g., Wi-Fi AP 5 GHZ) to the second WLAN (e.g., Wi-Fi AP 2.4 GHZ), according to various embodiments.

At 701, the method 700 includes establishing a connection with the Wi-Fi router 400 (e.g., Wi-Fi network 400) to initiate the VoWi-Fi call, which may relate to step 601. At 702, the method 700 includes sending an IKE_AUTH_REQUEST to the cPDG server of the operator network 500. After receiving the IKE_AUTH_REQUEST from the electronic device 10, the ePDG server of the operator network 30 sends an IKE_AUTH_RESPONSE to the electronic device 300. In other words, an ePDG tunnel is established between the electronic device 300 and the PDG server to offer security as a connection is made over an untrusted Wi-Fi network, and the VoWi-Fi call is initiated through the ePDG tunnel, which may relate to step 601.

At 703, the method 700 includes detecting the motion associated with the user of the electronic device 300, which may relate to step 603. At 704-705, the method 700 includes determining the VoWi-Fi migration score based on the one or more ePDG interface tunnel parameters and the one or more Wi-Fi channel parameters, which may relate to step 607. At 706, 707, 708, 709, the method 700 includes determining the RAT score based on the one or more RAT parameters (e.g., LTE/NR strength). At 707-710 and 708-711, the method 700 includes determining the WLAN score for each WLAN (e.g., first WLAN and second WLAN) of the plurality of WLANs based on the one or more corresponding Wi-Fi channel parameters, which may relate to 606. At 712, the method 700 includes pausing all WIFI sockets other than the established call, which may relate to step 602.

At 713, the method 700 includes sending an IP change request (e.g., MOBIKE*IP change request) to the ePDG server upon detecting a requirement of the voice communication migration from the first WLAN to the second WLAN. At 714, the method 700 includes sending a MOBIKE* IP change response to the electronic device 300. At 715, the method 700 includes establishing a connection with the Wi-Fi router 400 (e.g., the second WLAN) to continue the ongoing VoWi-Fi call. A MOBIKE protocol ensures that no new registrations occur when the electronic device IP assigned by a new Wi-Fi channel (e.g., the second WLAN (Wi-Fi AP 2.4 GHZ)) changes. In other words, the electronic device 300 is able to establish voice communication without requiring an cPDG reregistration procedure. As a result, no calls are dropped, and seamless switches between the Wi-Fi channels, which improves the user experience over the conventional VoWi-Fi call system 200.

Figure 8:
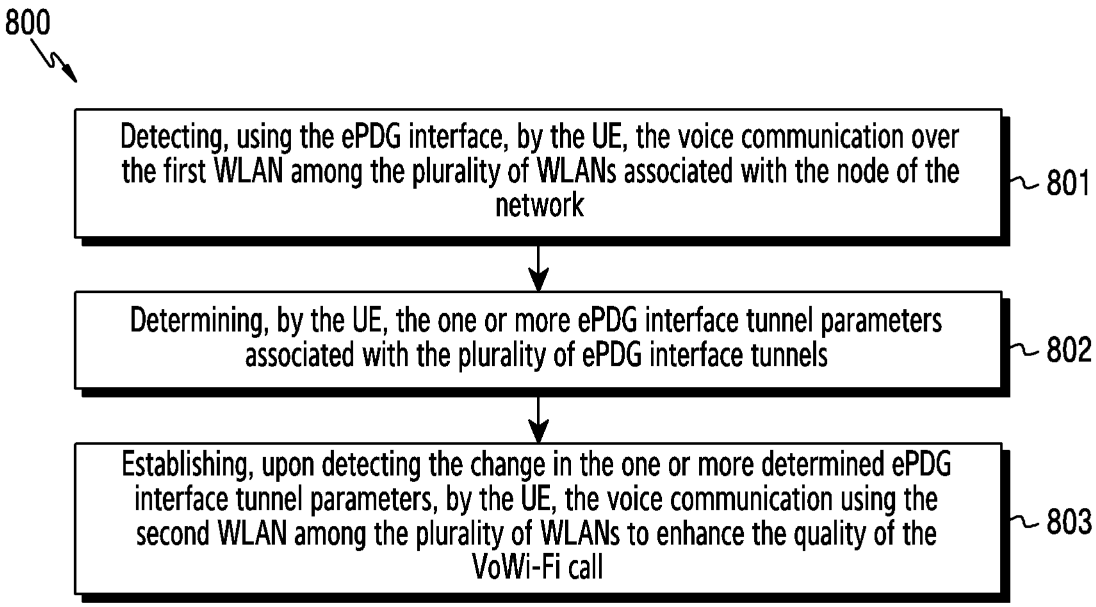
FIG. 8 is a flowchart illustrating an example method for enhancing the quality of the VoWi-Fi call, according to various embodiments.

FIG. 8 is a flowchart illustrating an example method 800 for enhancing the quality of the VoWi-Fi call, according to various embodiments.

At 801, the method 800 includes detecting, using the ePDG interface the voice communication over the first WLAN among the plurality of WLANs associated with the node of the network, which may relate to 601.

At 802, the method 800 includes determining the one or more ePDG interface tunnel parameters associated with the plurality of ePDG interface tunnels, which may relate to 606. The method 800 may execute multiple steps to determine the one or more ePDG interface tunnel parameters associated with the plurality of ePDG interface tunnels, which are given below.

In various embodiments, the method 800 includes detecting whether the electronic device 300 is in motion by monitoring sensor data of the electronic device 300. The method 800 further includes determining the one or more ePDG interface tunnel parameters associated with the plurality of WLANs in response to determining that the electronic device is in motion.

At 803, the method 800 includes establishing, upon detecting the change in the one or more determined cPDG interface tunnel parameters, the voice communication using the second WLAN among the plurality of WLANs to enhance the quality of the VoWi-Fi call, which may relate to 611. The method 800 may execute multiple steps to establish the voice communication using the second WLAN among the plurality of WLANs to enhance the quality of the VoWi-Fi call, which are given below.

In various embodiments, the method 800 includes determining whether the value of the one or more ePDG interface tunnel parameters associated with the first ePDG interface tunnel of the plurality of ePDG interface tunnels is greater than the threshold. The method 800 may further include:

a. Establishing the voice communication on the first ePDG interface tunnel in response to determining that the value of the one or more ePDG interface tunnel parameters associated with the first cPDG interface tunnel is greater than the threshold; or
b. Establishing the voice communication on the second ePDG interface tunnel of the plurality of ePDG interface tunnels in response to determining that the value of the one or more ePDG interface tunnel parameters associated with the first ePDG interface tunnel is lower than the threshold.

In various embodiments, the method 800 may include determining the corresponding VoWi-Fi migration score for a corresponding WLAN based on the correlation of the one or more determined ePDG interface tunnel parameters and one or more Wi-Fi channel parameters associated with the corresponding WLAN. The method 800 further includes determining the RAT score of the RAT node associated with the electronic device 300. The method 800 further includes migrating, based on the highest VoWi-Fi migration score among the corresponding VoWi-Fi migration score and the determined RAT score, the voice communication from the first WLAN to the second WLAN of the plurality of WLANs or the RAT node to enhance the quality of the VoWi-Fi call.

In various embodiments, the method 800 may execute multiple steps to migrate, based on the highest VoWi-Fi migration score among the corresponding VoWi-Fi migration score and the determined RAT score, the voice communication from the first WLAN to the second WLAN of the plurality of WLANs or the RAT node to enhance the quality of the VoWi-Fi call, which are given below.

The method 800 may include determining whether the determined RAT score is greater than the determined VoWi-Fi migration score. The method 800 may further include:

a. Migrating to the RAT node from the first WLAN in response to determining that the determined RAT score is greater than the determined VoWi-Fi migration score; or
b. Migrating to an optimal WLAN among the plurality of WLANs associated with the node of the network in response to determining that the determined RAT score is lower than the determined VoWi-Fi migration score, wherein the optimal WLAN comprises one of the first WLAN or the second WLAN that has the highest VoWi-Fi migration score among the corresponding VoWi-Fi migration score.

In various embodiments, the method 800 may include performing the voice communication corresponding to the VoWi-Fi communication. The method 800 further includes pausing, upon detecting the active communication, the one or more Wi-Fi sockets for all ongoing communication associated with one or more applications (e.g., social media application, gaming application, etc.) of the electronic device 300 excluding the VoWi-Fi communication.

In various embodiments, the method 800 may include detecting the change in connection from the first WLAN to the second WLAN. The method 800 further includes updating the active IP address of the first WLAN to the second WLAN to maintain the ePDG interface over the second WLAN within the network without initiating the new registration mechanism for the second WLAN.

In various embodiments, the method 800 utilizes the DPD to detect a dead IKE peer has been addressed by proposals that require sending periodic HELLO/ACK messages to prove liveliness.

In various embodiments, the method 800 utilizes the MOBIKE protocol. In general, IKEv2 is used for performing mutual authentication and establishing and maintaining IPsec Sas. It is implicitly created between the IP addresses that are used when IKE_SA is established. Currently, it is not possible to change these addresses after IKE_SA was created. There are scenarios where IP addresses might change like. Such scenarios depend on mobility and Multihoming. Mobility corresponds to a scenario where the host changes its point of network attachment and receives a new IP address, and multihoming is a scenario where a host desires to change a different Interface if, for instance, the currently used interface stops working for some reason.

The problem may be rectified by generating new IKE and IPsec SAs, but this is inefficient, hence a technique for updating IP addresses of existing IKE and IPsec SAs is required. The MOBIKE protocol is an example of such a system.

FIGS. 9A, 9B and 9C are diagrams illustrating an example scenario 900 for a seamless voice communication where the user of the electronic device 300 is moving around a house while making the VoWi-Fi call, according to various embodiments.

Consider the example scenario 900 where the user has installed the router 901 in the house to provide good internet connectivity, as illustrated in FIGS. 9A, 9B and 9C. The house includes various locations such as a hall (location-1), a dining (location-2), a room-1 (location-3), a room-2 (location-4), and a kitchen (location-5). The router 901 is located in the hall (location-1) and contains 2.4 GHz and 5 GHz operational Wi-Fi SSIDs. The coverage of the router 901 is shown by a dotted circle(s) with respect to multiple WLAN channels (e.g., Home_5G and Home_2.4G), as illustrated in FIGS. 9A, 9B and 9C.

The user may be currently located in the hall (location-1) as illustrated in FIG. 9A, where the router 901 provides the wireless network coverage in the hall and the electronic device 300 of the user retrieves multiple Wi-Fi SSIDs/WLANs of the router 901 (e.g., Home_5G and Home_2.4G). The electronic device 300 may select the first WLAN (e.g., Home_5G) to access the high-speed internet and establish the voice communication, using the ePDG interface, over the first WLAN among the plurality of WLANs associated with the node (e.g., router 901). Now, the user may move from the hall (location-1) to the dining (location-2) as illustrated in FIG. 9B. The electronic device 300 may detect the requirement of the voice communication migration from the first WLAN to the second WLAN (e.g., Home_2.4G) based on the corresponding VoWi-Fi migration score and/or one or more determined ePDG interface tunnel parameters and/or one or more Wi-Fi channel parameters associated with the corresponding WLAN. Further, the electronic device 300 may use old registration for the ongoing voice communication, as discussed in FIG. 7B. Now, the user may move again from the dining (location-2) to the room-2 (location-4) as illustrated in FIG. 9C. The electronic device 300 may detect the requirement of the voice communication migration from the second WLAN to the RAT node 902 upon detecting that the determined RAT score is greater than the determined VoWi-Fi migration score.

As a result, the electronic device 300 may have certain advantages and technical effects in comparison to the conventional VoWi-Fi call system 200. Such advantages may include maintaining the call quality of the voice communication, thereby avoiding any unnecessary disruptions such as mute, pauses, or space during a switch between VoWi-Fi network and/or Wi-Fi network. Another advantage of the electronic device 300 disclosed herein is that the electronic device 300 is capable of performing seamless switches between the Wi-Fi channels based on the ePDG call quality parameters (e.g., DPD, RTP packet loss, etc.). Also, the electronic device 300 can establish the voice communication without requiring an ePDG reregistration procedure.

The various actions, acts, blocks, steps, or the like in the flow diagrams may be performed in the order presented, in a different order, or simultaneously. Further, in various embodiments, some of the actions, acts, blocks, steps, or the like may be omitted, added, modified, skipped, or the like without departing from the scope of the disclosure.

Unless otherwise defined, all technical and scientific terms used herein have the same meaning as commonly understood by one ordinary skilled in the art to which this disclosure belongs. The system, methods, and examples provided herein are illustrative only and not intended to be limiting.

While specific language has been used to describe the present subject matter, any limitations arising on account thereto, are not intended. As would be apparent to one skilled in the art, various working modifications may be made to the method to implement the disclosure as taught herein. The drawings and the forgoing description give examples of various embodiments. Those skilled in the art will appreciate that one or more of the described elements may well be combined into a single functional element. Elements from one embodiment may be added to another embodiment.

The embodiments disclosed herein can be implemented using at least one hardware device and performing network management functions to control the elements.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by an electronic device in a wireless communication system, the method comprising:

performing, on an evolved Packet Data Gateway (ePDG) interface, a voice over Wi-Fi (VoWi-Fi) communication over a first wireless local area network (WLAN) among a plurality of WLANs;

determining one or more ePDG interface tunnel parameters associated with a plurality of ePDG interface tunnels;

detecting a change in the one or more ePDG interface tunnel parameters;

establishing the VoWi-Fi communication over a second WLAN among the plurality of WLANs; and pausing one or more Wi-Fi sockets for all ongoing communication associated with one or more applications of the electronic device excluding the VoWi-Fi communication.

2. The method of claim 1, wherein establishing the VoWi-Fi communication comprises:

determining whether a value of the one or more ePDG interface tunnel parameters associated with a first ePDG interface tunnel of the plurality of ePDG interface tunnels is greater than a threshold; and performing at least one of:

establishing the VoWi-Fi communication on the first ePDG interface tunnel in response to determining that the value of the one or more ePDG interface tunnel parameters associated with the first ePDG interface tunnel is greater than the threshold; or establishing the VoWi-Fi communication on a second ePDG interface tunnel of the plurality of ePDG interface tunnels in response to determining that the value of the one or more ePDG interface tunnel parameters associated with the first ePDG interface tunnel is less than the threshold.

3. The method of claim 1, wherein establishing the VoWi-Fi communication comprises:

determining a VoWi-Fi migration score for a corresponding WLAN based on a correlation of the one or more ePDG interface tunnel parameters and one or more Wi-Fi channel parameters associated with the corresponding WLAN;

determining a Radio Access Technology (RAT) score of a RAT node associated with the electronic device; and migrating, based on a highest VoWi-Fi migration score among VoWi-Fi migration scores and the RAT score, the VoWi-Fi communication from the first WLAN to the second WLAN of the plurality of WLANs or the RAT node.

4. The method of claim 3, wherein the one or more Wi-Fi channel parameters are used to determine an availability of an ePDG interface over each WLAN.

5. The method of claim 3, wherein migrating, based on the highest VoWi-Fi migration score among the VoWi-Fi migration scores and the RAT score, the VoWi-Fi communication from the first WLAN to the second WLAN of the plurality of WLANs or the RAT node comprises:

determining whether the RAT score is greater than the VoWi-Fi migration score; and performing at least one of:

migrating to the RAT node from the first WLAN in response to determining that the RAT score is greater than the VoWi-Fi migration score; or migrating to an optimal WLAN among the plurality of WLANs associated with a node of a network in response to determining that the RAT score is less than the VoWi-Fi migration score, wherein the optimal WLAN comprises one of the first WLAN or the second WLAN that has the highest VoWi-Fi migration score among the VoWi-Fi migration scores.

6. The method of claim 1, further comprising:

detecting a change in connection from the first WLAN to the second WLAN; and updating an active IP address of the first WLAN to the second WLAN to maintain an ePDG interface over the second WLAN within the network without initiating a new registration mechanism for the second WLAN.

7. The method of claim 1, wherein the one or more ePDG interface tunnel parameters comprises at least one of: a type of Wi-Fi network, a Received Signal Strength Indicator (RSSI), a Real-time Transport Protocol (RTP) packet loss, a Dead Peer Detection (DPD) timer expiry, or a motion associated with the electronic device.

8. The method of claim 1, wherein determining the one or more ePDG interface tunnel parameters comprises:

detecting whether the electronic device is in motion by monitoring sensor data of the electronic device; and determining the one or more ePDG interface tunnel parameters associated with the plurality of WLANs in response to determining that the electronic device is in motion.

9. An electronic device in a wireless communication system, the electronic device comprising:

at least one transceiver;

at least one processor communicatively coupled to the at least one transceiver; and at least one memory, communicatively coupled to the at least one processor, storing instructions executable by the at least one processor individually or in any combination to cause the electronic device to:

perform, on an evolved Packet Data Gateway (ePDG) interface, a voice over Wi-Fi (VoWi-Fi) communication over a first wireless local area network (WLAN) among a plurality of WLANs, determine one or more ePDG interface tunnel parameters associated with a plurality of ePDG interface tunnels, detect a change in the one or more ePDG interface tunnel parameters, and establish the VoWi-Fi communication over a second WLAN among the plurality of WLANs, and pause one or more Wi-Fi sockets for all ongoing communication associated with one or more applications of the electronic device excluding the VoWi-Fi communication.

10. The electronic device of claim 9, wherein, to establish the VoWi-Fi communication, the instructions cause the electronic device to:

determine whether a value of the one or more ePDG interface tunnel parameters associated with a first ePDG interface tunnel of the plurality of ePDG interface tunnels is greater than a threshold, and perform at least one of:

establishing the VoWi-Fi voice communication on the first ePDG interface tunnel in response to determining that the value of the one or more ePDG interface tunnel parameters associated with the first ePDG interface tunnel is greater than the threshold; or establishing the VoWi-Fi voice-communication on a second ePDG interface tunnel of the plurality of ePDG interface tunnels in response to determining that the value of the one or more ePDG interface tunnel parameters associated with the first ePDG interface tunnel is less than the threshold.

11. The electronic device of claim 9, wherein, to establish the VoWi-Fi communication, the instructions cause the electronic device to:

determine a VoWi-Fi migration score for a corresponding WLAN based on a correlation of the one or more determined ePDG interface tunnel parameters and one or more Wi-Fi channel parameters associated with the corresponding WLAN, determine a Radio Access Technology (RAT) score of a RAT node associated with the electronic device, and migrate, based on a highest VoWi-Fi migration score among VoWi-Fi migration scores and the RAT score, the VoWi-Fi communication from the first WLAN to the second WLAN of the plurality of WLANs or the RAT node.

12. The electronic device of claim 11, wherein the one or more Wi-Fi channel parameters are used to determine an availability of an ePDG interface over each WLAN.

13. The electronic device of claim 11, wherein, to migrate, based on the highest VoWi-Fi migration score among the VoWi-Fi migration scores and the RAT score, the VoWi-Fi communication from the first WLAN to the second WLAN of the plurality of WLANs or the RAT node, the instructions cause the electronic device to:

determine whether the RAT score is greater than the determined VoWi-Fi migration score, and perform at least one of:

migrating to the RAT node from the first WLAN in response to determining that the RAT score is greater than the VoWi-Fi migration score; or migrating to an optimal WLAN among the plurality of WLANs associated with a node of a network in response to determining that the RAT score is less than the VoWi-Fi migration score, wherein the optimal WLAN comprises one of the first WLAN or the second WLAN that has the highest VoWi-Fi migration score among the VoWi-Fi migration scores.

14. The electronic device of claim 9, wherein the instructions cause the electronic device to:

detect a change in connection from the first WLAN to the second WLAN, and update an active IP address of the first WLAN to the second WLAN to maintain an ePDG interface over the second WLAN within the network without initiating a new registration mechanism for the second WLAN.

15. The electronic device of claim 9, wherein the one or more ePDG interface tunnel parameters comprises at least one of: a type of Wi-Fi network, a Received Signal Strength Indicator (RSSI), a Real-time Transport Protocol (RTP) packet loss, a Dead Peer Detection (DPD) timer expiry, or a motion associated with the electronic device.

16. The electronic device of claim 9, wherein, to determine the one or more ePDG interface tunnel parameters, the instructions cause the electronic device to:

detect whether the electronic device is in motion by monitoring sensor data of the electronic device; and determine the one or more ePDG interface tunnel parameters associated with the plurality of WLANs in response to determining that the electronic device is in motion.

* * * * *